United States Patent
Cother

[15] 3,689,839
[45] Sept. 5, 1972

[54] MACHINE TOOL MONITORING SYSTEM

[72] Inventor: Robert H. Cother, Fullerton, Calif.

[73] Assignee: Becton, Dickinson Electronics Company, Pasadena, Calif.

[22] Filed: Jan. 25, 1971

[21] Appl. No.: 109,117

[52] U.S. Cl. .................................. 324/181, 324/71
[51] Int. Cl. ........................... G04f 9/00, G01n 27/00
[58] Field of Search ..................... 324/181, 71, 181 A

[56] References Cited

UNITED STATES PATENTS 2,946,646  7/1960  Bower et al. ................. 324/181

Primary Examiner—Alfred E. Smith
Attorney—Reed C. Lawlor

[57] ABSTRACT

A system is provided for measuring the time during which a machine tool is performing useful work, such as cutting a work piece. During cutting, the work piece and a work member are in electrical contact with each other. But when both the work piece and work member are rotating with respect to each other and they are not cutting, they are electrically insulated from each other. An electrical circuit having a power source is connected to the machine tool. One terminal of the power source is electrically connected to the work piece and the other terminal is electrically connected to the work member. A first signal is detected during the rotation of the work piece and the work member with respect to each other and the time during which such rotation occurs is measured. A second signal is detected when the machine is performing work and the time during which the machine is performing work is measured.

6 Claims, 4 Drawing Figures

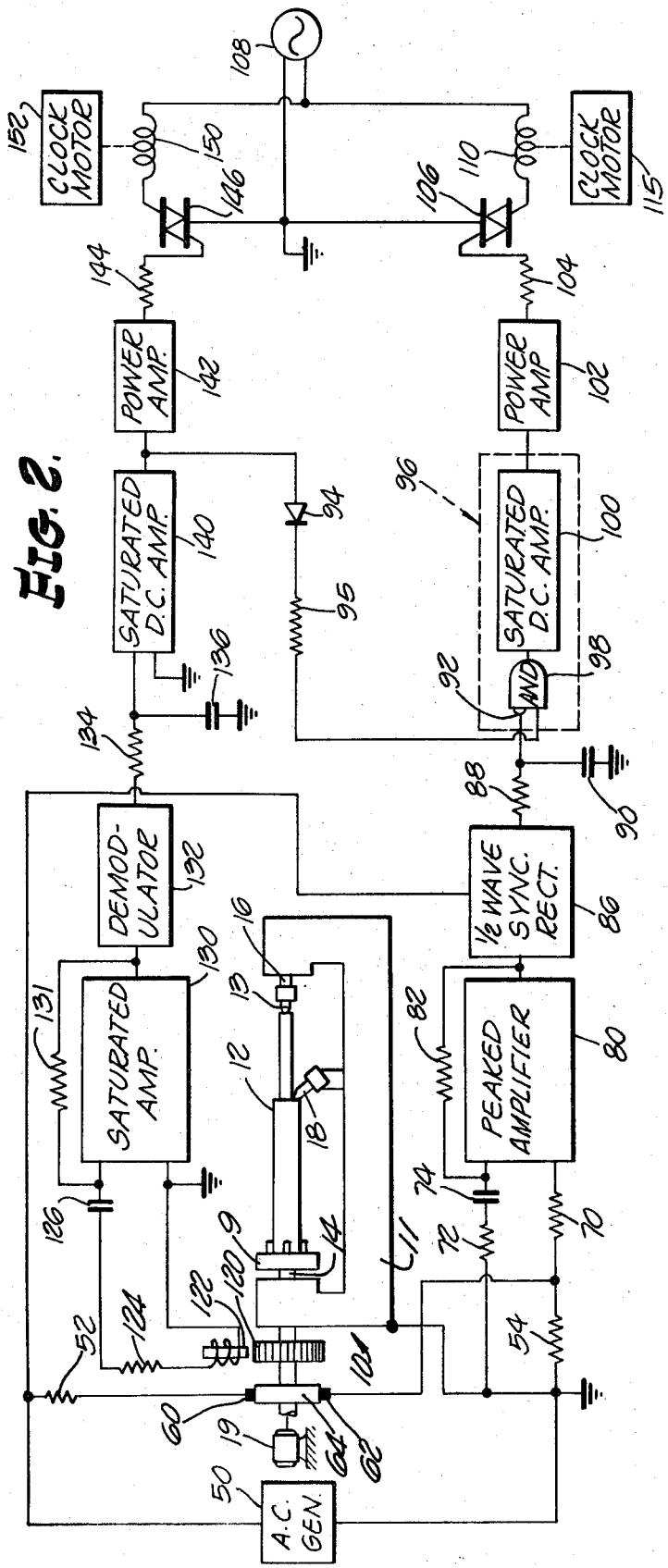
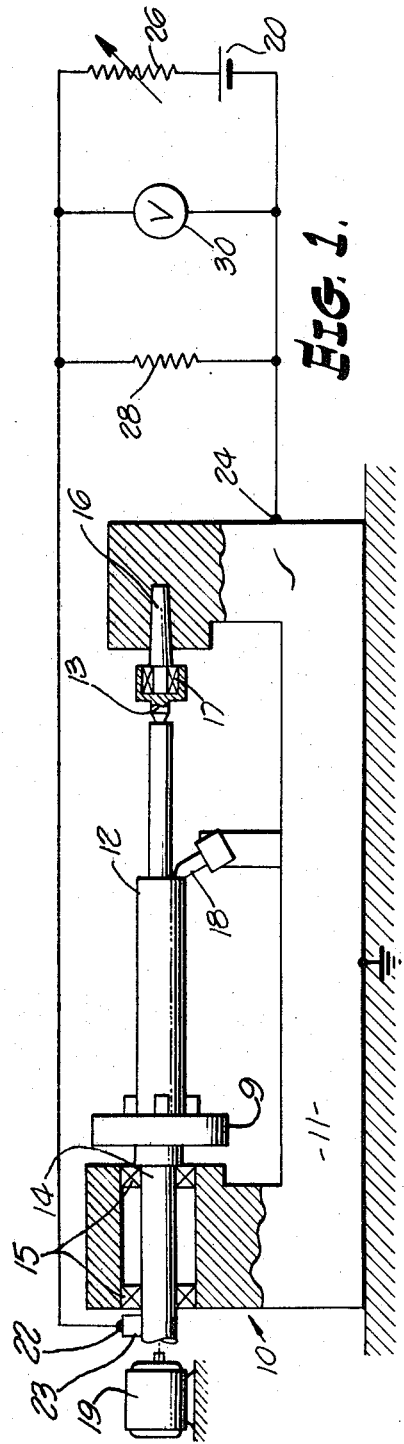
Fig. 1.
Fig. 2.
ROBERT H. COTHER
INVENTOR
ATTORNEY

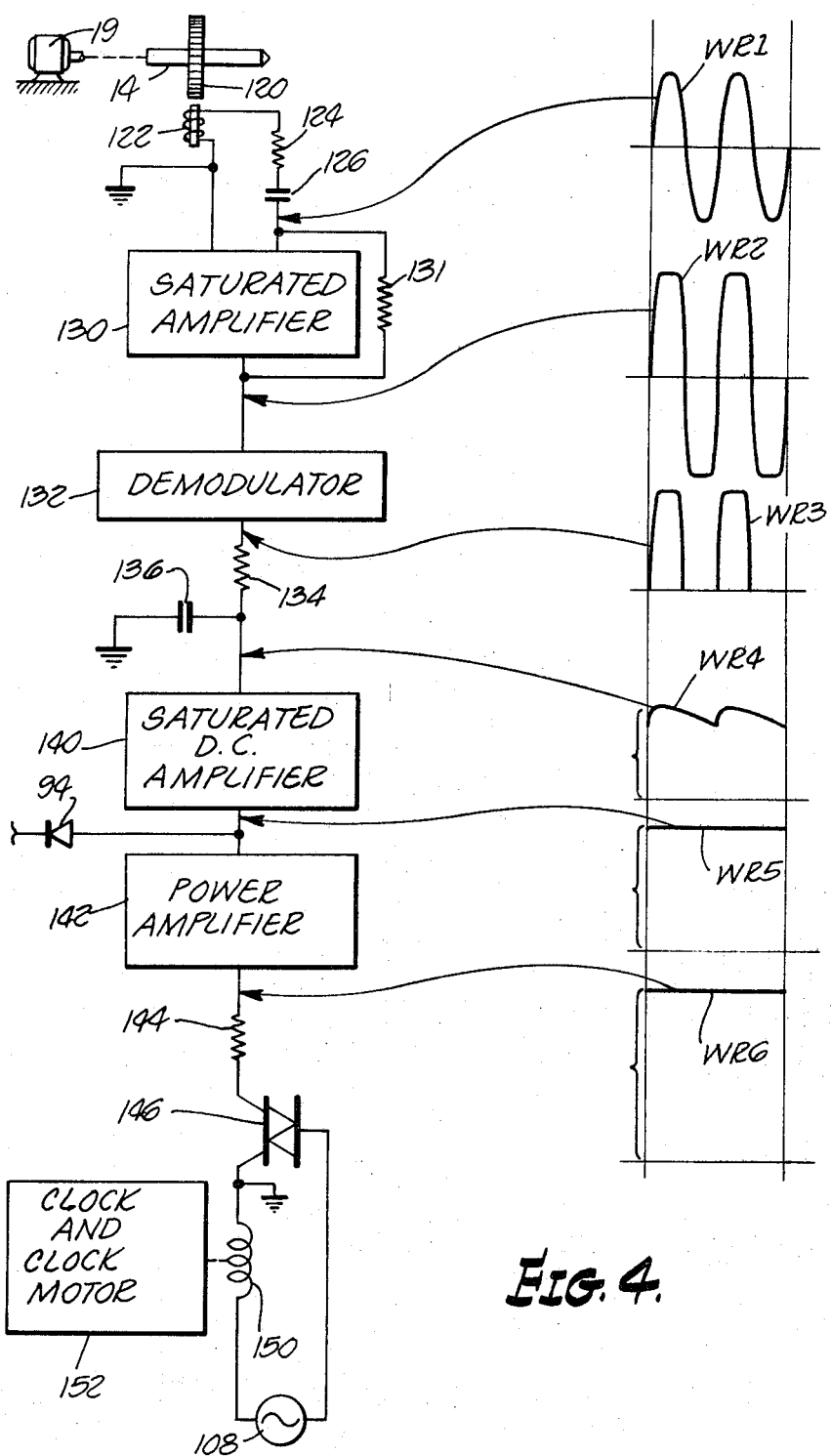

MACHINE TOOL MONITORING SYSTEM

BACKGROUND OF THE INVENTION

This invention relates to a new and useful apparatus and method for measuring the time during which a machine tool is performing work.

Many types of devices have been constructed to measure various machine-tool operation times, such as the total time during which certain cutting tools are used so that the cutting tools may be replaced at the optimum time. Such apparatus typically employ switches which are mechanically closed at least once during each cutting cycle. For example, a cutting head may mechanically close a switch as the cutting head reaches its forward cutting position. The closing of such a switch actuates a counting mechanism. Alternatively, some systems detect the current flowing in various branches of a machine control circuit in order to determine the time which the machine tool spends on each of various machine operations.

More recently, a device has been marketed which is adapted to measure the cutting time of a machine tool. This device comprises a spindle energizer. The energizer applies a radio frequency current to the spindle of the machine tool in question, thus producing an alternating electromagnetic field in the neighborhood of the cutting tool. A pick-up coil is positioned near the spindle and work member or cutting tool so that when the work piece and cutting tool are in contact, a current is induced by the magnetic field in the pick-up coil, which current is different from the current in the coil when the cutting tool and work piece are not in contact. This current provides an indication of contact between the cutting tool and work piece and thus an indication of when work is being performed.

However, in using this latter device, as well as in using some of the other prior art apparatus, care must be taken in positioning the components of the monitoring system. It has been commonly assumed that the rotating spindle of a lathe or the like is electrically connected to ground. I have discovered, however, that this assumption is not true for machine tools which employ a piece of metal (work piece) or a cutting tool (work member) which rotate on bearings lubricated with a dielectric lubricant, such as oil, grease, or the like. Such a work piece or work member is electrically insulated from the rest of the machine tool by this lubricant when it is rotating. Taking advantage of this discovery, I have invented a novel machine tool monitoring system for detecting the time during which such a machine tool is performing work, such as cutting.

SUMMARY OF THE INVENTION

A machine tool monitoring system is provided for a machine which is adapted to receive an electrically conductive work piece and having an electrically conductive work member. In the machine, the work member and the work piece are electrically connected together when work is being performed on the work piece and the work member and the work piece are electrically insulated from each other when both work is not being performed on the work piece and when the work piece and work member are moving in a work producing manner with respect to each other. The monitoring system comprises an electrical circuit having a first terminal electrically coupled to the work piece and a second terminal electrically coupled to the work member. The electrical circuit also includes electrical signal supply means and means for detecting the flow of electrical current between the work piece and the work member while work is performed on the work piece.

The foregoing and other features of the invention will be understood by reference to the following description taken in connection with the accompanying drawings wherein:

FIG. 1 is a wiring diagram of a monitoring apparatus embodying the invention;

FIG. 2 is a block diagram of a second embodiment of the monitoring apparatus embodying the invention;

FIG. 4 is a more detailed partial block diagram of the monitoring apparatus shown in FIG. 2.

Figure 3:
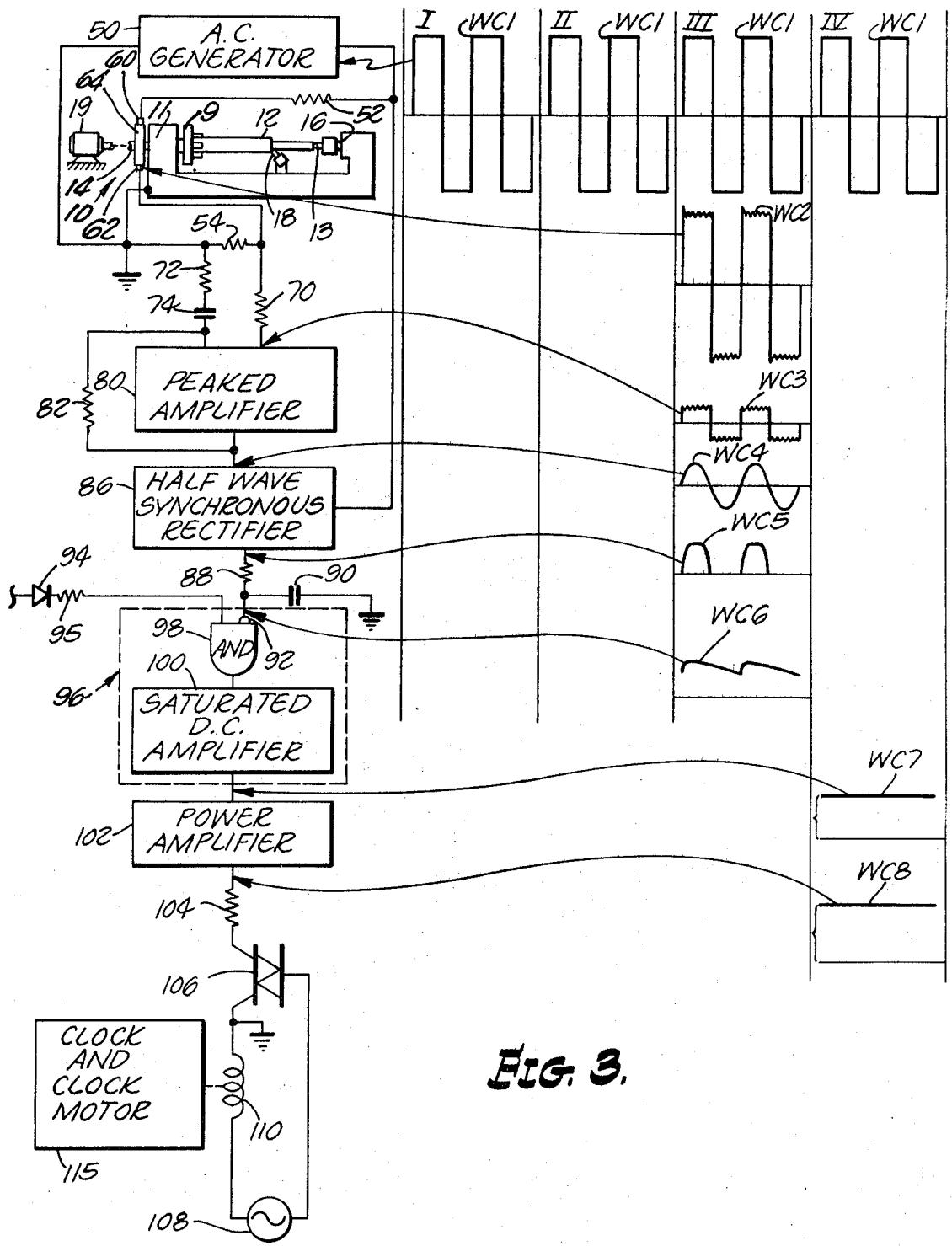
FIG. 3 is a more detailed partial block diagram of the monitoring apparatus shown in FIG. 2.

While reference is made to a lathe throughout the application to illustrate the invention, it will be understood that this invention also applies to various other types of machine tools, such as milling machines, drill presses, and the like. The invention is described with respect to a rotating work piece and a "stationary," that is, non-rotating cutter. However it will be understood that the cutting or work member could rotate, all within the scope of this invention.

In the embodiment of the invention shown in FIG. 1, a machine tool 10 is electrically connected to ground, such as by mounting it on the floor of a machine shop with electrically conductive legs.

An electrically conductive work piece 12 is mounted on the lathe 10 by means of an electrically conductive chuck 9 and an electrically conductive live centering member 13. Chuck 9 is mounted on electrically conductive rotatable spindle 14. Spindle 14 is driven by electric motor 19. Centering member 13 is mounted on shaft 16 by lubricated bearings 17. Spindle 14 is mounted on lathe 10 by lubricated bearings 15. Spindle 14 is sometimes in electrical contact with the bed 11 of the lathe 10, as will be explained more fully hereinafter. Work piece 12 is thus sometimes in electrical communication with the lathe bed 11. An electrically conductive cutting tool or work member 18 is carried by the lathe.

When work is to be performed, the work member 18 mechanically contacts the work piece 12 at the same time that the spindle 14 is rotated by the motor 19 of lathe 10, thereby cutting the work piece 12.

In order to measure the time during which the work piece 12 is being cut, a battery 20 is connected across the spindle 14 and the lathe bed 11. A first terminal 22 of the battery 20 is electrically coupled to the spindle 14 while a second terminal 24 of the battery is electrically coupled to the lathe bed 11. An electrical connector 23, such as a small bar of copper, is secured to the terminal 22. This bar of copper 23 rides on the periphery of the spindle 14 and provides electrical communication between the terminal 22 and the spindle 14. A variable resistor, or rheostat, 26 is connected in series between the battery 20 and the first terminal 22. A fixed resistor 28 is connected in parallel across variable resistor 26 and battery 20. A voltmeter 30 is connected in parallel with resistor 28 and across variable resistor 26 and battery 20.

In certain machine tools, such as lathe 10, the spindle 14 rotates on anti-friction bearings 15 which are lubricated by a dielectric lubricant, such as oil, grease, or the like. A dielectric lubricant is a lubricant having a low electrical conductivity. Similarly when the centering member 13 is in use, it rotates with the work piece, thus rotating the similarly lubricated bearing 17. I have found that a dielectric lubricant employed to lubricate anti-friction bearings provides electrical insulation below certain voltage limits, between the spindle 14 and centering member 13 and the machine tool bed 11 when the spindle is rotating. Moreover, the electrical insulating properties of the film increases, on the average, with the speed of rotation of the spindle 14 and centering member 13. The average breakdown voltage of the film thus generally increases with the speed of rotation.

The breakdown voltage of the lubricating film varies even when the rotation speed is constant. Such variations occur randomly and are due in part to irregularities in the bearings and in adjacent surfaces.

When breakdown occurs, current flows between the bearings and adjacent surfaces. When such breakdown occurs, the voltage across the bearing and adjacent surfaces decreases, thus allowing the lubricant to heal itself or to once again become an insulator. The voltage continues to decrease until the dielectric once again becomes an insulator. This lower voltage is called the healing voltage. Current flow between the bearing and adjacent surfaces is once again stopped when the lubricant becomes an insulator and the voltage between the bearing and adjacent surfaces then quickly increases until the breakdown voltage is reached again.

Repetition of this cycle produces what is called "-grass," or a noisy signal, between the bearings and adjacent surfaces. This noisy signal is an erratic saw-toothed-wave signal which may be detected across the bearings and adjacent surfaces. The amplitude of the frequency components of this saw-tooth wave signal depends on the speed of rotation of the bearings.

By way of example, for a 4-inch diameter bearing lubricated with a commercial oil, a grassy signal occurs when a voltage of only about 8–10 millivolts is applied across the film when the spindle is rotating at about 4 rpm and when 1 volt is applied across the film when the spindle is rotating at about 1,000 rpm and when 2 volts are applied across the film when the spindle is rotating at about 2,000 rpm.

Returning to FIG. 1, when the spindle 14 and centering member 13 are rotating and when cutting tool 18 is not in contact with the work piece 12 and when the voltage applied by battery 20 across the spindle 14 and centering member 13 on the one hand and machine tool bed 11 on the other hand is below the breakdown voltage of the dielectric lubricant, no current will flow between the spindle 14 and machine tool bed 11. However, when the spindle stops rotating, it sometimes sinks through the film of lubricant and comes into electrical contact with the bearings which also sink through the lubricating film and come into electrical contact with the machine tool bed 11. This provides a path for electrical current to flow between the spindle 14 and the bed 11, thus shorting the spindle to the bed.

In the embodiment of the invention shown in FIG. 1, the battery 20 is a 1 1/2 volt battery and the voltmeter is an 8 millivolt full-scale voltmeter. When the terminals 22 and 24 are electrically coupled to the spindle 14 and to the machine tool bed 11 respectively, substantially no voltage will be detected by the meter 30 when the spindle 14 is not rotating and cutting tool 18 is not contacting the work piece 12. When the spindle 14 is rotating, such as 10 to 15 rpm, and cutting tool 18 is not contacting the work piece 12, a substantially higher voltage, such as 6 to 8 mv, will be detected by the meter 30. When the work is being performed on the work piece 12, that is, when the spindle 14 is rotating at the same time that the work piece 12 and cutting tool 18 are in contact with each other, current will flow between work piece 12, spindle 14 and cutting tool 18 and substantially no voltage will be detected by the meter 30.

Thus, by reading the meter 30, rotation of the spindle 14 without cutting tool 18 contacting the work piece 12 can be distinguished from the situations where either the machine is turned off or work is being performed. These latter two situations can be distinguished from each other by observing whether the spindle 14 is rotating. Therefore, by reading the meter 30 and at the same time observing whether the spindle 14 is rotating, the time during which useful work, such as cutting, is being performed by the lathe 10 may be measured.

In the second embodiment of the invention, shown in FIGS. 2, 3, and 4, an apparatus is provided in accordance with the invention which automatically measures the cutting time and the time during which the spindle 14 is rotating. In this second embodiment of the invention, an AC power source or generator is employed. An AC source has the advantage over a DC source of overcoming electrical noise generated by adjacent machinery, balancing out any electrolytic processes which may occur because of moisture in the lubricant, and avoiding effects of thermoelectric voltages. The use of AC of a predetermined frequency also makes it possible to discriminate against noise from other sources. However, it will be obvious to those skilled in the art that a DC source could also be employed.

In this second embodiment of the invention, an electrical power supply in the form of an AC generator 50 has a first terminal connected through current limiting resistor 52 to a first low-impedance brush 60 and a grounded second terminal connected through resistor 54 to a second low-impedance brush 62. A second pair of brushes may be employed on the spindle 14 to increase the reliability of the system. The low-impedance brushes 60 and 62 are composed of a conductive material, such as a composition of 50 percent to 80 percent graphite with a balance of silver. Brushes 60 and 62 contact continuous slip ring 64 which is composed of a conductive material, such as copper or the like. Slip ring 64 is secured to the spindle 14 of the lathe 10.

Resistor 54 has a resistance which is substantially greater than the resistance of the lathe 10 between the brush 60 and ground when the spindle is not rotating. The bed 11 of lathe 10 is electrically grounded.

FIG. 3 shows the cutting channel of the second embodiment of this invention, which corresponds to the lower portion of the block diagram of FIG. 2. The cutting channel is that portion of the measuring device which measures the cutting time of the lathe. FIG. 4 shows the rotation channel of the measuring device which corresponds to the upper portion of FIG. 2. The rotation channel is that portion of the measuring device which measures the time during which the spindle 14 is rotating.

Referring to the cutting channel shown in FIGS. 2 and 3, a peaked saturated amplifier 80 is connected across resistor 54. Amplifier 80 includes a narrow band pass filter which is narrowly peaked at 1 KC. Resistor 70 is connected between resistor 54 and one input terminal of amplifier 80. A second resistor 72 and capacitor 74 are connected in series between resistor 54 and the second input terminal of amplifier 80. A negative feedback resistor 82 is connected between the second input terminal and the output of amplifier 80.

The output of peaked amplifier 80 is supplied to half-wave synchronous rectifier 86. Rectifier 86 is also connected to the first terminal of AC generator 50.

Amplifier unit 96 is connected to receive the output of rectifier 86. Amplifier unit 96 includes a saturated DC amplifier 100 having an AND gate 98 at its input. An RC circuit, comprising resistor 88 and capacitor 90, is connected between the output of the rectifier 86 and a first input terminal of AND gate 98. An inhibitor 92 is connected at the first input leg of the AND gate 98. A DC signal from the rotation channel (FIG. 4), to be described more fully hereinafter, is supplied through diode 94 and resistor 95 to a second input leg of the AND gate 98.

Power amplifier 102 receives the output of saturated DC amplifier 100. The output of power amplifier 102 is supplied to a first input terminal of triac 106 through series resistor 104. A 60 cycle per second power source 108, such as that supplied by a house wall socket, is connected to second and third terminals of the triac 106.

A coil 110 is connected between the second terminal of the triac 106 and one terminal of the power source 108. A clock 115, having an inductively driven clock motor, is positioned so that the clock motor of the clock 115 is driven by the magnetic field generated around coil 110 when current from source 108 passes through the coil 110.

The operation of the cutting channel will be explained with reference to FIG. 3. Generator 50 supplies a 1 kilocycle per second (1 KC) square wave AC signal of about 10 volts to the system. This signal is represented by curves WC1 in the first row of columns I to IV. The resistances of resistors 52 and 54 are such that a current of about 2 to 3 ma flows through the brushes 60 and slip ring 64.

Column I represents the signals at various points in the cutting channel when the lathe is idle. When the spindle 14 is not rotating and cutting tool 18 is not in contact with the work piece 12, current flows directly from the brush 60, through slip ring 64 and spindle 14 (and bearing 17), to the lathe bed 11 which is connected to ground. This, in effect, shorts out the entire cutting channel and only a small signal, if any, will appear across the resistor 54. This is shown by the absence of any signal, other than the signal WC1 of generator 50, in column I.

When the spindle 14 is not rotating but cutting tool 18 is in contact with the work piece 12, the signal through the cutting channel is again shorted out, this time also through work piece 12, as is shown in Column II of FIG. 3.

When the spindle 14 is rotating but cutting tool 18 is not in contact with the work piece 12, the spindle 14 will be electrically insulated from the lathe bed 11 by a lubricating film as previously described. In this situation, as is represented by curve WC2 in column III, a small 1 KC signal is developed between the brush 62 and ground. However, due to the breakdown of the dielectric lubricant between the bearings and adjacent surfaces, as previously described, a noisy secondary signal is imposed on the 1 KC signal. The frequency of this noisy secondary signal depends upon the speed of the rotation of the spindle 14 and typically may be as much as 30 KC to 100 KC. The amplitude of this secondary signal varies between the breakdown voltage and the healing voltage of the lubricating film, as has been previously described.

The noisy 1 KC signal is detected across the resistor 54. Approximately 1.5 mv to 4 volts is developed across resistor 54, as is represented by curve WC2 in column III of FIG. 3.

Peaked amplifier 80 is employed to selectively attenuate the grass or noisy portion of the signal detected across resistor 54 and to selectively amplify the 1 KC signal, thereby converting the low voltage noisy signal into a higher voltage 1 KC signal as is represented by curve WC4 in column III. This arrangement thus discriminates against stray noise from other equipment in the neighborhood.

This 1 kcps signal is rectified by half-wave synchronous rectifier 86 which transmits a pulsed DC signal, represented by curve WC5 in column III. The RC circuit comprising resistor 88 and capacitor 90 converts the pulsed DC signal received from rectifier 86 into a continuous DC signal, represented by curve WC 6 in column III. The time constant of the RC circuit is long compared with intervals during which the cutter may be momentarily out of contact with the work piece during intermittent cuts in normal operation. It is also long compared with the period of the AC generator. Typically this time constant is about 0.010 seconds.

This DC signal is applied to the inhibitor 92 at one input terminal of AND gate 98. A DC signal from the rotation channel, to be described hereinafter, is applied to the other input leg of the AND gate 98 through diode 94. The AND gate 98 is actually a high gain switch which, due to the inverter 92, turns off when the voltage at the input to the inverter exceeds 700 mv. This voltage corresponds to 1 ½mv across resistor 54. Accordingly, during rotation when signals appearing across the resistor 54, are less than the 1 ½mv, the AND gate is turned on, but when larger signals appear across resistor 54, the AND gate is turned off. Thus the AND gate 98 transmits signals to amplifier 100 only when a signal of less than 1 ½mv is applied to inhibitor 92 provided there is a positive voltage signal applied to the other terminal of AND gate 98 from the rotation channel.

Therefore, in the present situation where the spindle 14 is rotating but cutting tool 18 is not contacting the work piece 12, a large signal will be applied to inhibitor 92 and therefore the conditions for passing a signal through the AND gate are not satisfied and no signal is transmitted to the rest of the cutting channel.

When the spindle 14 is rotating and cutting tool 18 is contacting the work piece 12, that is, when cutting is being performed on the work piece 12, the noisy 1 KC signal is shorted by the contact between the spindle 14 and the work piece 12 and only a very small signal, if any, appears across resistor 54. The signals in the cutting channel for this situation may be seen in column IV.

At the same time, a rotation signal is applied through diode 94 and resistor 95 to the AND gate 98. This situation satisfies the conditions for passing a signal through the AND gate 98 to saturated DC amplifier 100. The signal applied to amplifier 100 is a substantially constant amplitude signal, represented by curve WR5 in FIG. 4, received from the rotation channel. This signal is amplified by saturated DC amplifier 100 to produce signal WR7 and by power amplifier 102 to produce signal WR8 which is applied, through resistor 104, to a first input of triac 106.

Triac 106 acts as a switch or gate to couple the 60 cps power source 108 to the motor of the clock 115 only when a positive signal is received from power amplifier 102. When such signal is received, that is, when cutting of the work piece 12 occurs, the triac 106 applies an AC signal from power source 108 to the coil 110 which in turn operates the motor of the clock 115.

From the foregoing it will be seen that clock 115 is not operated unless there is cutting, that is, the spindle 14 is rotating when cutting tool 18 is contacting the work piece 12. The time accumulated by clock 115 is therefore the total cutting time of the lathe 10.

The rotation channel, shown in FIG. 4 and in the upper portion of FIG. 2, measures the time during which the spindle 14 of the lathe 10 is rotating. As may be seen in FIGS. 2 and 4, a toothed ring 120 is connected to, and is adapted to rotate with, the spindle 14. The toothed ring 120 is composed of a ferromagnetic material, such as iron. A magnetic pickup or solenoid, 122, in the form of an iron core composed of a permanent magnet encircled by a coil, is mounted adjacent to the toothed ring 120. As the toothed ring 120 and the spindle 14 rotate, a current is induced in the coil of the magnetic pickup 122. This induced current provides a signal proportional to the speed of rotation of the spindle 14. A toothed ring 120 having 60 teeth and rotating on spindle 14 at approximately 1,100 rpm will induce a signal in the pickup 122 having a frequency of approximately 1.1 KC and an amplitude of about 10 volts. When the spindle 14 is not rotating, no current is induced in the magnetic pickup 122 and therefore no rotation signal is produced.

The main component of such a rotation signal, when present, is an AC sine wave, represented by curve WR1 in FIG. 4. This AC signal is applied, through a resistor 124 and a capacitor 126, to a first input leg of saturated amplifier 130. A negative feedback resistor 131 is connected between the first input leg and the output leg of amplifier 130. The amplified AC signal, represented by curve WR2, is applied to demodulator 132 which rectifies the AC signal to produce a pulsed DC signal, represented by curve WR3. The pulsed DC signal is applied to saturated DC amplifier 140 after passing through an RC circuit which comprises resistor 134 and capacitor 136. This RC circuit produces a continuous DC signal, represented by curve WR4. The time constant for this RC circuit is approximately 100 milliseconds when the frequency of the signal from the pickup 122 is about 1.1 KC.

Saturated DC amplifier 140 amplifies the DC signal and produces a signal of substantially constant amplitude, represented by curve WR5. This DC signal is applied both to the input of power amplifier 142 and to one input terminal of AND gate 98 in the cutting channel, as has been previously described in connection with the cutting channel.

The DC signal, after amplification by amplifier 142, to produce an amplified DC signal represented by curve WR6, is applied through resistor 144 to a first input of triac 146. Triac 146 is connected to power source 108 and to coil 150. When a signal is applied to the input of triac 146, the AC signal from the power source 108 is applied to coil 150 which induces a current in the motor of the clock 152. Triac 146 acts as an open switch unless a signal is applied to it from power amplifier 142. Therefore, the clock 152 records the total time during which the spindle 14 rotates.

The efficiency, or load factor, of a machine tool may be defined as a ratio of cutting time to spindle rotation time. Therefore, by comparing the time recorded on clocks 115 and 152, the efficiency of operation of the lathe 10 may be calculated.

In another embodiment of the invention, not shown, the magnetic pickup 122 previously described is replaced by two leads which detect the noisy signal across the brushes 60 and 62. This signal is then applied to a rotation channel which is similar to that previously described. But when the spindle 14 is not rotating, substantially no signal at all will appear across the brushes.

Thus, a device is provided for measuring the time during which cutting or similar work is being performed by a lathe or by a similar machine tool. This measuring device does not employ extra insulation, such as insulating sleeves, and is easily installed on a machine tool. The device of this invention also measures the time during which the lathe spindle is rotating so that machine efficiency may be calculated.

It is to be noted that in the foregoing description, the tacit assumption has been made that the spindle is not grounded through the motor. In practice the motor is not usually of the direct drive type, as might be implied from the figures, but is connected to the spindle through gearing or belts and the like. All these drive mechanisms, including the direct drive arrangement, insulate the spindle from the ground during rotation of the spindle, and thus do not interfere with the operation of the system described.

While the invention has been described in connection with a machine tool in which one of the members rotates, it is also applicable to machine tools, such as shapers and planers, in which neither the work piece nor cutter rotates, but in which the moving element is supported on a lubricant during operation.

It is to be understood, of course, that the invention may be modified in many ways within the scope of the appended claims. In particular, it is to be understood that the invention is not limited to the specific embodiments disclosed or to the numerical values employed in describing the invention. Furthermore, many other types of components may be employed to practice the invention in place of those which have been specifically described.

The invention claimed is:
1. A device for measuring the time during which a machine tool is performing work wherein the machine tool comprises an electrically conductive work member and is adapted to receive an electrically conductive work piece and wherein the work member and the work piece are electrically connected together when both the work member and work piece rotate with respect to each other and mechanically contact each other and wherein the work piece and the work member are electrically insulated from each other when the work piece and the work member are both out of mechanical contact with each other and are rotating with respect to each other, the improvement comprising:
   means for producing a varying electrical signal in accordance with the rotation of said work piece;
   first amplifying means for amplifying said rotation signal;
   means for converting said rotation signal into a substantially constant amplitude rotation signal;
   a first power source connected to said converting means;
   first measuring means connected to said power source and adapted to be actuated by said first power source when said substantially constant amplitude rotation signal is transmitted by said converting means;
   a second power source having a first terminal coupled to said work piece and a second terminal connected to said work member;
   a resistor connected in series between said second terminal and said second power source, said resistor having a relatively high resistance compared with the resistance of the work member and said machine tool so that a substantial no-cutting alternating signal appears across said resistor only when work is not being performed by said machine tool;
   second amplifying means connected across said resistor for amplifying said no-cutting signal;
   rectifying means connected to said second amplifying means for converting said no-cutting signal into a substantially constant amplitude no-cutting signal;
   switch means connected to said second amplifier and to said converting means adapted to transmit a cutting signal only when both a rotation signal is present and when said no-cutting signal is absent from the input of said switch means; and
   second measuring means connected to said first power source, said first power source also being connected to said switch means, said second measuring means being adapted to be actuated by said first power source when a cutting signal is transmitted by said switch means.

2. A device for measuring the time during which a machine tool is performing work wherein the machine tool comprises an electrically conductive work member and which is adapted to receive an electrically conductive work piece and wherein the work member and work piece are electrically connected together when both the work member and work piece rotate with respect to each other and mechanically contact each other and wherein the work piece and the work member are electrically insulated from each other by a dielectric lubricant when the work piece and the work member are both out of mechanical contact with each other and are rotating with respect to each other, the improvement comprising:
   means for producing a varying electrical signal in accordance with said rotation;
   first amplifying means connected to said rotation signal producing means for amplifying said rotation signal;
   means connected to said first amplifying means for converting said varying rotation signal into a substantially constant amplitude rotation signal;
   second amplifying means connected to said converting means for amplifying said substantially constant amplitude rotation signal;
   a first clock having a clock motor;
   a first alternating power source coupled to the motor of said first clock;
   first gate means connected to said second amplifying means and to said first power source, said gate means being adapted to be actuated by said substantially constant amplitude rotation signal to couple said first power source to said first clock motor only when said rotation signal is transmitted by said second amplifying means in order to provide a measurement of the time of said rotation;
   first and second brushes coupled to said work piece;
   a second alternating power source having a first terminal connected to the first brush and having a second terminal connected to said work member and to the second brush;
   a resistor connected in series between said second brush and said second terminal of said second power source, said resistor having a relatively high resistance compared to the resistance of said work member and said machine tool so that a substantial no-cutting alternating signal appears across said resistor only when work is not being performed by said machine tool;
   third amplifying means connected across said resistor for amplifying said no-cutting signal;
   rectifying means connected to said third amplifying means for converting said no-cutting signal into a substantially constant amplitude no-cutting signal;
   second gate means connected to said third amplifying means and to said converting means to receive said substantially constant amplitude no-cutting signal and said constant amplitude rotation signal, said second gate means having an inhibitor on said no-cutting signal so that a cutting signal is transmitted through the second gate only when a rotation signal is present and a no-cutting is absent from the input of said second gate, said second gate thereby transmitting a cutting signal only when work is being performed by said machine tool;
   fourth amplifying means connected to said second gate means;
   a second clock having a second clock motor coupled to said first power source; and
   third gate means connected to said fourth amplifying means and to said first power source, said third gate means being adapted to couple the first power source to the second clock motor only when said cutting signal is transmitted by said fourth amplifying means in order to provide a measurement of the time during which the machine is performing work.

3. A device for measuring time as defined in claim 2 further comprising:
a slip ring coupled to said work piece, said first and second brushes being adapted to ride on said slip ring, and wherein said first and second brushes are low impedance brushes.

4. A device for measuring the time during which a machine tool is performing work as defined in claim 3 wherein said rotation signal producing means comprises a toothed ring composed of ferromagnetic material adapted to rotate with said work piece and an inductance coil and permanent magnet mounted adjacent to said toothed ring.

5. A device for measuring the time during which a machine tool performs work wherein said machine tool comprises a work piece and a rotating member, said measuring device comprising:
means adapted to produce a varying electrical signal in accordance with the rotation of said rotating member;
first amplifying means connected to said rotation signal producing means for amplifying said rotation signal;
means connected to said first amplifying means for converting said varying rotation signal to a substantially constant amplitude rotation signal;
second amplifying means connected to said converting means for amplifying said substantially constant amplitude rotation signal;
a first clock having a clock motor;
a first alternating power source coupled to the motor of said first clock;
first gate means connected to said second amplifying means and to said first power source, said gate means being adapted to be actuated by said substantially constant amplitude rotation signal to couple said first power source to said first clock motor only when said rotation signal is transmitted by said second amplifying means;
a second alternating power source having a first terminal adapted to be coupled to said work piece and having a second terminal adapted to be coupled to said machine tool and to said work piece;
a resistor connected in series between said second terminal and said second work piece, said resistor having a relatively high resistance compared with the resistance of said work piece and said machine tool;
third amplifying means connected across said resistor for amplifying no-cutting signals appearing across said resistor;
rectifying means connected to said third amplifying means for converting said no-cutting signal into a substantially constant amplitude no-cutting signal;
second gate means connected to said third amplifying means and to said converting means to receive said substantially constant amplitude no-cutting signal and said substantially constant amplitude rotation signal, said second gate means having an inhibitor on said no-cutting signal so that a cutting signal is transmitted through the second gate only when a rotation signal is present and a no-cutting signal is absent from the input of the gate;
fourth amplifying means connected to said second gate means;
a second clock having a second clock motor coupled to said first power source; and
third gate means connected to said fourth amplifying means and to said first power source, said third gate means being adapted to couple the first power source to the second clock motor only when said cutting signal is transmitted by said fourth amplifying means.

6. In a method for measuring the time during which a machine tool is performing work wherein the machine tool is adapted to receive an electrically conductive work piece and has an electrically conductive work member, the work piece and the work member being in electrical contact when both the work piece and the work member are in mechanical contact with each other and are rotating with respect to each other, the work member and the work piece being electrically insulated from each other when both said work piece and said work member are out of mechanical contact with each other and are rotating with respect to each other, the steps of:
applying an alternating voltage across the work member and the work piece;
detecting a flow of electrical current between the work member and the work piece;
generating a first signal in accordance with said detected current flow;
amplifying said first signal;
rectifying said first signal to produce a substantially constant amplitude first signal;
generating a varying electrical signal in accordance with said rotation;
amplifying said rotation signal;
rectifying said rotation signal to produce a substantially constant amplitude rotation signal;
combining said first signal and said rotation signal;
generating a second substantially constant amplitude signal only when a rotation signal is present and when the amplitude of said first signal is below a predetermined magnitude;
amplifying said second signal;
measuring the time during which said second signal is present; and
measuring the time during which said substantially constant amplitude rotation signal is present.

* * * * *